Patented Aug. 12, 1930

1,773,001

UNITED STATES PATENT OFFICE

FREDERICK W. HUBER, OF RIVERSIDE, CALIFORNIA

ACCELERATING AND IMPROVING HYDRAULIC CEMENT

No Drawing.  Application filed November 22, 1928.  Serial No. 321,276.

The present invention relates to a novel material for use in imparting high early strength, good plasticity and workability, to Portland cement, by grinding the same with the cement, to thereby produce a cement which will give mortars or concrete having good plasticity and workability and giving high early strength, and which will very substantially increase the early strength of the set cement products, and will not decrease (and may somewhat increase) the ultimate or final strength of the set products.

Various materials have been added to cement and cement mortar, to impart plasticity or workability and more ready flow in a form or mold, for example such materials as diatomaceous earth, talc, highly colloidal clay, bentonite, graphite and the like have been used. These materials however are open to the objection that they generally decrease by a substantial amount both the early strength and the ultimate strength of the finished set cement products.

The product which I add to the cement clinker at the time of grinding the same or which I thoroughly mix with the ground cement (e. g. by passing the two simultaneously through a suitable grinding mill) is a colloidal complex body formed by reaction between Portland cement and calcium chloride and water, this product, due to the reactions which take place in the process becomes converted into a semi-elastic material of cheese-like consistency, which can be readily ground with the Portland cement clinker or with the cement itself, to produce an intimate mixture. This cheese-like material itself has strong hydraulic properties.

In the preferred form of carrying out my invention I proceed as follows:—Dry or solid calcium chloride is mixed with water in such proportions as to produce a supersaturated solution, containing about 50% of actual calcium chloride. Since ordinarily dry calcium chloride is not anhydrous but contains considerable quantities of water of crystallization, it is always advisable or necessary to know the amount of actual calcium chloride in the material under treatment. In a particular example, 100 parts of solid calcium chloride containing about 75% of actual calcium chloride and 25% of water (water of crystallization) was mixed with 35 parts of water at atmospheric temperature.

A liquid mass was thus formed which contained about 44% of water and 56% of calcium chloride, and due to the heat formed in the operation of dissolving this calcium chloride in water, the liquid became quite warm, (about 76° C.). To one volume of this solution or liquid there was then added, with constant stirring, an equal volume of dry Portland cement, thereby forming a liquid mass of creamy consistency. The stirring of the mass was continued until the mass "clabbered" or became thick and gelatinous, at which point stirring was discontinued. A strongly exothermic reaction then took place and the whole mass became hot and after a short time solidified, into a semi-elastic mass of cheese-like consistency. During and after the exothermic reaction some water was liberated from the mixture in the form of steam. The formation of this cheese-like mass took an hour or so, whereas the formation of the clabber-like or gelatinous mass took about 3 to 5 minutes.

This cheese-like mass above referred to was of a consistency resembling Swiss cheese and it had a semi-elastic or somewhat rubbery consistency. The material at this stage can be described as being a colloidal gel-like reaction product. I do not attempt to explain the chemical reaction, nor to give the chemical formula of this product. The mass had lost more or less of its water but still would not be regarded as a dry solid. In some cases the said cheesy material contained about 20 to 25% of water.

It will be understood that the procedure of this particular example does not have to be followed absolutely but proportions, times, temperatures, etc., are here given by way of example, and the same are subject to considerable variation.

The initial supersaturated solution of calcium chloride may be about 50% concentration, or it may vary more or less from this figure, for example from about 40% or 45% to about 60% of actual calcium chloride. I have referred above to using an equal volume of the supersaturated calcium chloride solution with the Portland cement, but these proportions may vary more or less depending upon the quality and characteristics of the Portland cement used. Thus to 10 volumes of solution, I may use say 6 to 15 volumes of the solid cement.

In grinding the material of cheesy consistency with the Portland cement clinkers or with the Portland cement, I may use from 1 to 10% of the material, based on the amount of the cement.

As illustrating the accelerating action, the compressive strength of cement sand mortar was about doubled in 24 hours, by the use of 5% of this material.

I have above referred to adding this product to Portland cement, but it can also be added, in the amount of about 1 to 10%, to other hydraulic cements, e. g. natural cements, semi-natural cements, Rosendale cements, hydraulic lime, slag cements, etc.

I claim:

1. A process of producing a product suitable for quickening hydraulic cement which comprises first forming a highly concentrated solution of calcium chloride and thoroughly mixing same with enough hydraulic cement to form a creamy consistency, then stirring the mixture until it acquires at least a gelatinous consistency.

2. A process of producing a product suitable for quickening hydraulic cement which comprises first forming a highly concentrated solution of calcium chloride and thoroughly mixing same with enough hydraulic cement to form a creamy consistency, then stirring the mixture until it acquires a gelatinous consistency, and allowing such mass to stand until it acquires a cheesy consistency.

3. The step of thoroughly incorporating a mixture of water and calcium chlorid in the proportions of about 40 to 55% of water to 60 to 45 parts of actual calcium chlorid, with about an equal volume of powdered hydraulic cement, to form a creamy, readily flowable consistency and maintaining the same well mixed until the mass thickens to at least a gelatinous mass.

4. A process which comprises adding one volume of ground Portland cement to about an equal volume of a warm solution of $CaCl_2$ of about 50% concentration, and stirring same until a jelly-like mass is formed, then allowing the mixture to stand during the ensuing exothermic chemical reaction to form a mass of cheese-like consistency.

5. A process which comprises adding one volume ground Portland cement to about an equal volume of a warm solution of $CaCl_2$ of about 50% concentration, and stirring same until a jelly-like mass is formed, then allowing the mixture to stand during the ensuing exothermic chemical reaction to form a mass of cheese-like consistency, and grinding the latter with Portland cement or clinker.

6. A colloidal gel-like reaction product of calcium chlorid, water and Portland cement, such product being adapted for being ground with a large amount of Portland cement to improve the properties of the latter.

7. A ground mixture of Portland cement with a small percentage of a colloidal gel-like reaction product of calcium chlorid, water and Portland cement.

In testimony whereof I affix my signature.

FREDERICK W. HUBER.